J. R. WOODROUGH.
Hand-Saw.
No. 202,500.  Patented April 16, 1878.
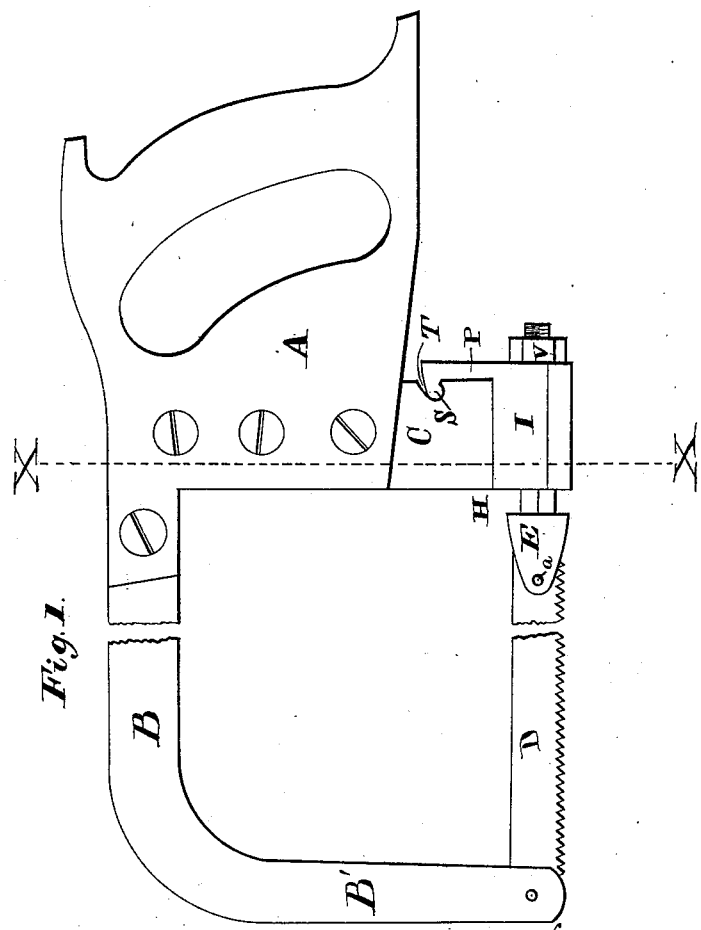

UNITED STATES PATENT OFFICE.

JAMES R. WOODROUGH, OF CINCINNATI, OHIO, ASSIGNOR TO HIMSELF AND WOODROUGH & McPARLIN, OF SAME PLACE.

IMPROVEMENT IN HANDSAWS.

Specification forming part of Letters Patent No. 202,500, dated April 16, 1878; application filed March 11, 1878.

*To all whom it may concern:*

Be it known that I, JAMES R. WOODROUGH, a resident of the city of Cincinnati, county of Hamilton, and State of Ohio, have invented certain new and useful Improvements in Strained Saws, of which the following is a specification:

My invention consists in a new and useful configuration of the buckle-holder and the shank of the saw-frame, whereby the same can be quickly united together in a strong and durable manner, and the saw strained, and, when desired, be as quickly separated.

A great advantage of my invention arises from the fact that both the shank and the buckle-holder can be more quickly and cheaply manufactured than the separable buckle-holder now in use, and also than where the buckle-holder and shank are in one and the same piece.

In the accompanying drawing, making part of this specification, Figure 1 is a side elevation of a strained saw embodying my invention; and Fig. 2 is a vertical cross-section taken at the dotted line $x\ x$ of Fig. 1.

A represents the handle; B, the back of the frame, preferably made in one piece with shank C of the frame. D is the saw-blade. Both the back and the saw-blade are here broken and shortened, to bring the same conveniently within the drawing.

E is the usual buckle, into which one end of the saw-blade is slid, and riveted fast at $a$. This buckle is provided with an extension, H, on the end of which is cut a screw-thread, the extension being sufficiently long to pass through and extend beyond the rear end of the buckle-holder I when the latter has been placed in position on the shank. This buckle-holder, in addition to the hole through its lower portion from front to rear, has a groove, L, in its upper part of a size such as to just admit and closely fit over the lower end of the shank C, and is also provided with a vertical extension, P, provided at its end with a hook-shaped projection, S, which closely fits into the recess T, formed in shank C. The usual nut, V, for straining the saw is screwed onto that part of the extension H which extends beyond the buckle-holder.

The various portions of the saw are usually put together as follows, viz: The handle is attached to the frame, the buckle E riveted, as aforementioned, to one end of the saw-blade, and the other end of the saw-blade riveted to the forward end B' of the frame. The extension H of the buckle is then introduced into the hole of the buckle-holder I, and the latter then fitted onto the shank, the hooked projection S being hooked into the recess T, and the groove L being fitted over the end of the shank. The nut V is then screwed onto the end of extension H of the buckle and turned till the saw-blade is strained. The buckle-holder is now securely held in position, the groove preventing it from slipping laterally, and the extension P from slipping forward, and the hook-flange E from falling vertically.

The buckle-holder is removed by unscrewing nut V and drawing the holder off the extension.

While I have shown my invention as applied to a butcher-saw, it is equally applicable to back-saws and other varieties of strained saws.

The buckle-holder I and the shank C, being separate, are more readily shaped and finished, and the peculiar form of the buckle-holder, together with the fact that its surfaces are, with the exception of the hooked projection S, all plane surfaces, enables it to be ground and finished very economically and expeditiously.

What I claim as my invention is—

1. The buckle-holder I, provided with extension P, hooked projection S, and groove L, substantially as and for the purposes set forth.

2. The buckle-holder I, substantially as described, in combination with buckle E H, nut V, and shank C, substantially as and for the purposes set forth.

JAS. R. WOODROUGH.

Attest:
H. W. WOODROUGH,
FRANK A. LEE.